United States Patent [19]

Bourgeois et al.

[11] Patent Number: 4,796,238

[45] Date of Patent: Jan. 3, 1989

[54] SYSTEM FOR MEASUREMENT OF THE ACOUSTIC COEFFICIENT OF REFLECTION OF SUBMERGED REFLECTORS

[75] Inventors: Aline Bourgeois, Paris; Jean-Claude Bourgeois, Le Fief, both of France

[73] Assignee: Institut Francais du Petrole, Rueil-Malmaison, France

[21] Appl. No.: 901,802

[22] Filed: Aug. 29, 1986

[30] Foreign Application Priority Data

Aug. 29, 1985 [FR] France ................. 85 12990

[51] Int. Cl.$^4$ ..................... G01S 9/66; G01W 1/00
[52] U.S. Cl. .......................... 367/87; 367/901; 73/170 A
[58] Field of Search ............ 367/106, 88, 15, 21, 367/130, 118, 125, 135, 901, 87; 73/170 A

[56] References Cited

U.S. PATENT DOCUMENTS

| | | | |
|---|---|---|---|
| 2,480,561 | 8/1949 | Ewing et al. | 367/106 |
| 3,174,128 | 3/1965 | Don et al. | 367/106 |
| 3,555,499 | 1/1971 | MacDonald et al. | 367/901 |
| 4,216,537 | 8/1980 | Delignieres | 367/106 |
| 4,225,954 | 9/1980 | Medwin | 367/125 |

Primary Examiner—Thomas H. Tarcza
Assistant Examiner—Daniel T. Pihulic
Attorney, Agent, or Firm—Antonelli, Terry & Wands

[57] ABSTRACT

System to measure the coefficients of reflection of submerged surfaces such as the seabed, by comparison of the intensities of acoustic impulses propagated between a source and a receptor, both of which are submerged, and that of the echoes of these impulses on the reflectors. For this purpose, there is provided a programmed calculator, an interface card to communicate with different units: an echo-sounder, a source triggering detector, a shot box to control the source and a recorder, a programmable attenuator, an acquisition card driven by the calculator and bearing an adjustable type filter and a circuit, also controlled by the calculator, for modifying the functioning parameters of the attenuation and of the filter, and fixing the starting parameters.

7 Claims, 4 Drawing Sheets

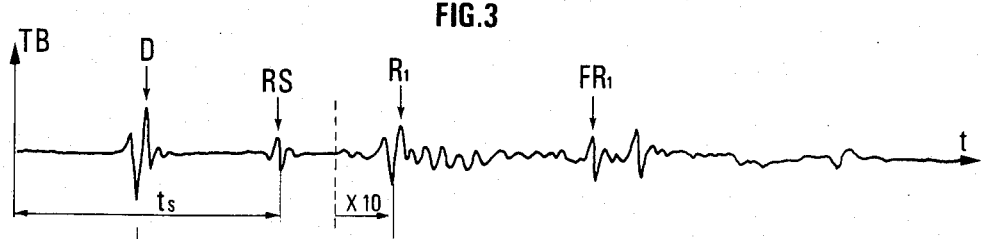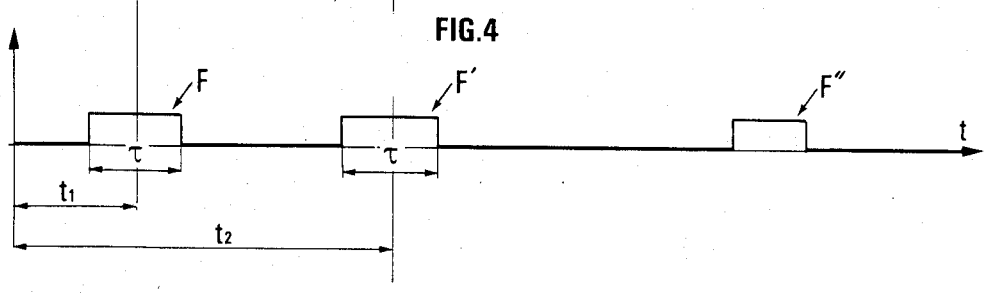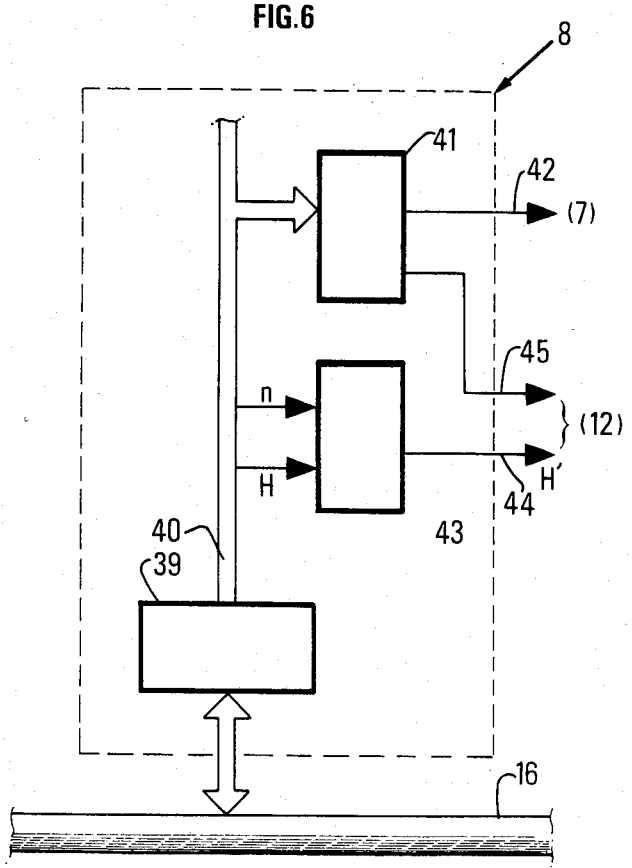

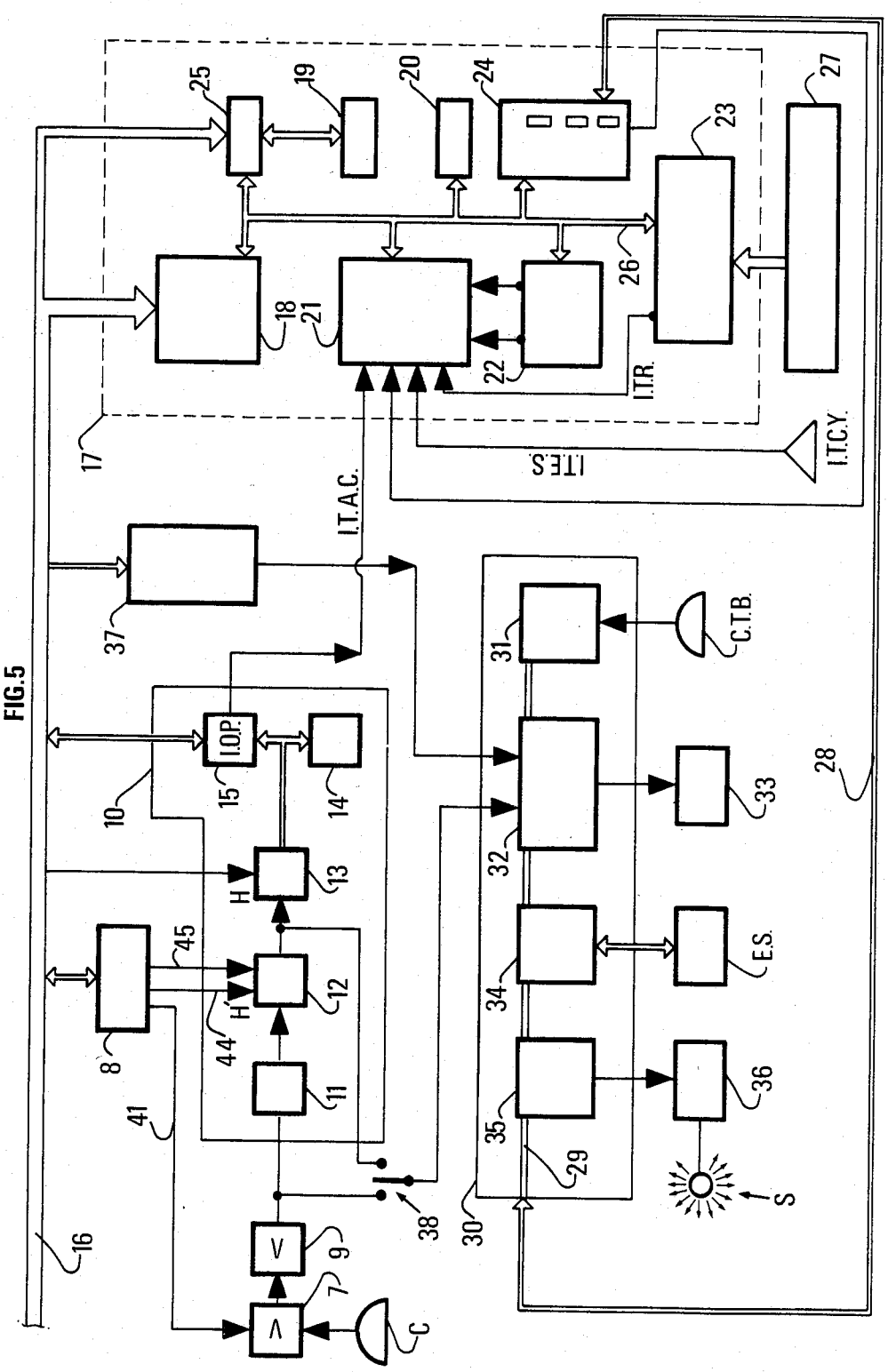

SYSTEM FOR MEASUREMENT OF THE ACOUSTIC COEFFICIENT OF REFLECTION OF SUBMERGED REFLECTORS

The object of the invention is to measure the coefficient of reflection of sub-sea surfaces, in particular the measurement of the coefficient of reflection of the sea bed.

In the same way as deep-profile seismic surveys have been developed to obtain representations of deep subterrainean layers, methods of studying superficial layers have been found.

One such method, which consists in measuring the coefficient of seabed reflection, enables the determination of the lithology of subjacent formations, which is very important for numerous applications such as cable-laying, pipe-laying, anchoring of petroleum installations, especially drilling platforms, and also harbour installations, etc.

A device exists which permits the determination of the coefficient of reflection of the seabed by comparing the amplitude of sound waves emitted by a sonar and that of the echoes on the seabed of these waves.

The mathematical relationship that describes the attenuation of the sound waves through interaction with the seabed, and which depends on the amplitude of signals emitted and received, the appropriate characteristics of the sonar circuits and the attenuation through signal propagation, is interpreted by a group of cabled circuits which include logarithmic amplifiers. Such a device is described in the U.S. Pat. No. 3,555,499.

Having to use specialised circuits with set configurations does have drawbacks in that they are hard to modify for the purposes of data acquisition and subsequent signal modification.

It is desirable to be able to modify the positions of the sampling gates and their sampling periods, and to change the laws of amplification gain of the signals received as well as their characteristic parameters, in order to determine the coefficient of reflection of the bed, or to modify the signals received in real time so that the operators can determine immediately all types of data on the nature of the seabed and possibly modify the operating conditions to accommodate changes.

This system, according to the invention, allows the determination of the coefficient of reflection of underwater sound waves emitted through a submerged wave source towed by a vessel and received by a detector.

This device has a detector close to the source to determine the successive triggering times of the source and other detection means towed by the vessel that are offset longitudinally in relation to the source. The vessel contains an echo-sounder, the source of which is linked to a control panel.

It has a programmable digital computer, with means for recording and an interface card involving circuits to allow communication between the computer and the receptor closest to the source, the means for recording and the unit for control of the source. It also has means to effect variable attenuation of signals received by the means for reception and amplification, a data acquisition unit driven by the computer and incorporating the means for adjustable filtering and linked to an analog-to-digital converter with a means driven by the computer to control the means for attenuation and filtering, as well as the means for establishing an interactive dialogue between operator and calculator.

As a result of its particular structure, the system according to the present invention is particularly adapted to the determination of the coefficient of reflection of underwater surfaces under the various operating conditions to which the system may be subjected in use.

In using variable means of attenuation and filtering, and controlling these with a programmable digital computer adapted to drive the means for attenuation and filtering and consequently to alter the signals received during the period of their acquisition and then to effect at will after their acquisition different modifications to improve the quality of the results received—all under the permanent control of an operator—makes the measurement system, according to the invention, very flexible.

Other characteristics and advantages of the system will appear in the reading of the description of a preferable but not singular embodiment, and by consulting the following diagrams:

FIG. 3 is a schematic diagram of a recording trace received by the means of reception;

FIG. 4 is a diagram which represents the position within each cycle of the sampling gates for direct wave paths, reflected waves, and one gate for background noise;

FIG. 5 is a schematic diagram of a possible configuration of the measurement system according to the invention;

FIG. 6 is a schematic diagram of the control circuit, of the means of attenuation and of filtering.

Figure 1:
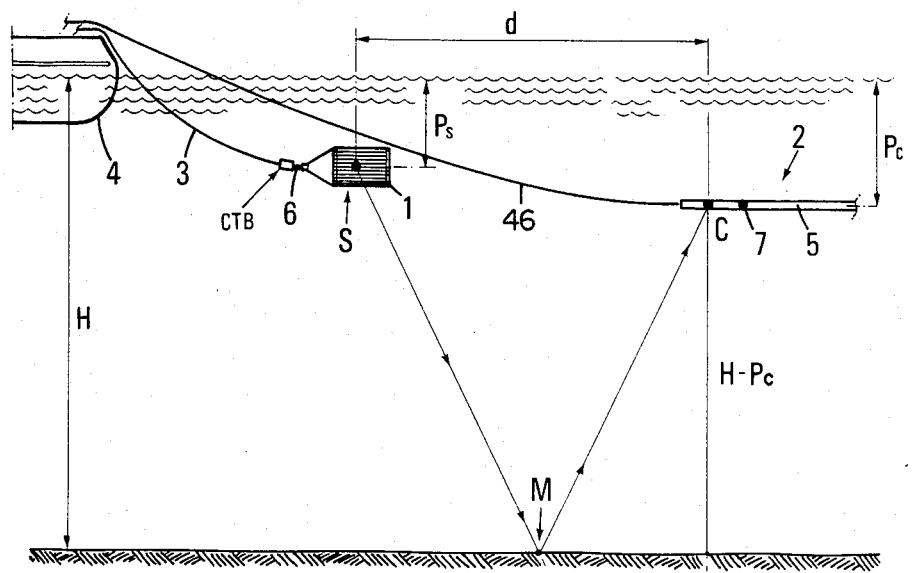
FIG. 1 is a diagram which represents schematically the relative positions of the source, receptor and towing vessel.

Measuring the coefficient of reflection of submerged reflecting surfaces, such as those beneath a body of water, involves the use of an emitter of sound waves 1 (FIG. 1) and a detector 2 for detecting these sound waves.

The emitter used is one whose dimensions relative to the wavelengths of the waves emitted is so small as to be considered a point-source, for example a sparker such as the one described in the application for French Patent published No. 2.574.559. This sparker consists of a cylindrical cage comprised of a plurality of tubes each featuring numerous exit orifices for electrodes, joined by a common towing and power cable 3 to a high-tension electric generator (not shown) situated for example on the vessel 4.

A sound detector CTB is situated beside the source 1 in order to measure its depth of immersion $p_s$ and the detection of successive triggering impulses that are translated by a signal TB. The connecting cable 3 includes a line which connects the detector CTB to an electronic system situated on the vessel, which will be described below in relation to FIG. 5.

The sound waves are picked up by means of a receptor C situated for example in the head part of an elongated unit 5 also towed by the vessel 4. The receptor C consists of a hydrophone or numerous interconnected hydrophones. The towing cable 46 of the detector 5 includes the wires for transmitting the signals detected by the receptors to equipment on board the vessel (represented in FIG. 5).

Each measurement cycle of the coefficient of reflection of a reflector, such as the seabed, is comprised of the emission of waves from the source 1, the detection of the signal TB as it is formed by the detector CTB associated with the source, the reception of sound waves transmitted directly, and those of echoes on different reflectors, a recording stage, and a processing stage in which the equipment on board determines in real-time the coefficient of reflection of a reflector such as the seabed from the different signals which are transmitted in response to the detected sound waves.

Figure 2:
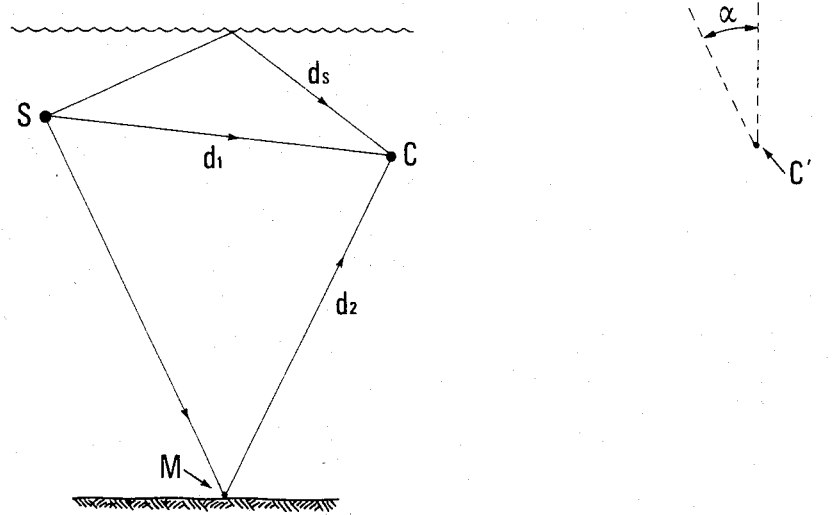
FIG. 2 is a diagram which shows the different paths of sound waves between the source and the means of reception.

The acoustic signals transmitted to the equipment on board are the signal TB, indicative of each emission, which marks the beginning of each cycle and the successive signals picked up by the detector C. The first (path $d_1$) corresponds to the direct propagation between the source S and the detector C (FIG. 2), the second (path $d_s$) to a reflection from the air/water interface, the third (path $d_2$) to a primary reflection from the seabed. Other signals follow, coming from single reflections on subterranean reflections, or from multiple reflections originating in the air/water interface and the different reflectors.

On the recording trace represented in FIG. 3, the arrivals corresponding to the paths $d_1$, $d_s$, $d_2$ give rise to the signals $D_1$, $R_s$ and $R_1$ received at times $t_1$, $t_s$ and $t_2$ respectively.

The signal $FR_1$ corresponds to a double reflection from the air/water interface and the seabed. For clarity of the drawing, the signals received after the RS signal are amplified with a gain of 10. The value of the coefficient $-1$, the parasitic wave from the surface is out of phase from the direct wave D, which makes it clearly recognisable.

The measurement of the coefficient of reflection requires the measurement of the amplitudes of the direct sound waves D, of the first reflected impulses $R_1$ and the intervals between their propagation times, in order to determine the weakening of the signal due to propagation. The coefficient of reflection K is expressed by the relation:

$$K = \frac{a_2 \, t_2}{a_1 \, t_1} \tag{1}$$

where $a_1$ and $a_2$ represent the values of the direct and reflected wave parameters respectively and where $t_1$ and $t_2$ represent the respective intervals of propagation times. The values of the direct and reflected waves $a_1$ and $a_2$ are, for example, the amplitudes of the largest peak of each signal, whether positive or negative, or the amplitude peak-to-peak obtained after calculating the sum of the largest positive and negative peak.

One can also choose, as a characteristic parameter of each signal received, its energy measured over a certain time interval.

The measurements of amplitude or energy are carried out, for example, by taking from each signal received a number of impulses at regular periods within a sampling gate F, F' (FIG. 4) of constant "size".

In practice the length of the sampling gate is in the order of a few milliseconds and the sampling frequency in the order of a few tens of kilohertz.

Measuring the maximum amplitude of the signal requires the selection of the sample with the largest amplitude. The energy of the signals is measured, for example, by obtaining the sum of the squares of the number of amplitudes n taken during a sampling period of constant length or by taking the sum of the absolute values of these same samples.

In the first case, if $X_i$ and $X_j$ are samples taken from the direct signal D and the reflected signal $R_1$, the coefficient of reflection K is expressed by the equation:

$$K = \frac{t_1}{t_o} \sqrt{\frac{\sum_{j=1}^{n} X_j^2}{\sum_{i=1}^{n} X_i^2}} \tag{2}$$

In the second case, the coefficient K is expressed by the equation:

$$K = \frac{t_1}{t_o} \frac{\sum_{j=1}^{n} |X_j|}{\sum_{i=1}^{n} |X_i|} \tag{3}$$

To isolate the acoustic signals D and $R_1$ (FIG. 3) from the sum of the signals received as a result of each emission, involves positioning the sampling gates F and F' respectively in relation to these signals and consequently knowing the geometric arrangements of source and receptor and their positions in the water.

The propagation period of the first reflected signal $R_1$ can be determined by triangulation using the values of the water depth, depth of immersion of the source 1 and that of the receptor C and the longitudinal offset between them.

Water depth is measured with an auxiliary echo-sounder, the one on the towing vessel for example. The echo-sounder generally carries out a number of measurements during each measurement cycle of the coefficient of reflection. The depth measurement used in the triangulation is the average value of different depths obtained.

Two depth gauges 6 and 7 (FIG. 1), one situated beside the source 1 and the other in the front of the elongated receptor 5, measure the depths of immersion of $p_s$ and $p_c$ respectively.

The distance d between the source and the detector C is known as soon as the emission-reception device is in the water, by the length of the towing cables from the source and from the receptor. It is determined while operational by the propagation interval $t_1$ between the source and the detector. The value obtained during a measurement cycle is used to position the sampling gate for the direct arrival signal of the next cycle.

The two-way propagation time $t_2$ of the signal $R_1$ (FIG. 3) over the distance SMC between source and detector is expressed by the relation:

$$t_2 = \frac{SMC}{V} \frac{2H - P_s - P_c}{V \cos \alpha} \tag{3}$$

where $(2H - P_s - P_c)$ represents the distance between the detector C and its image in relation to the seabed, the inclination of the wave-path SM from the vertical, and V the speed of sound in water.

The calculation of the time $t_2$ by way of geometry is mainly carried out during an initialization phase which precedes the emission-reception cycles, in order to position the gate F' (for the reception of the reflected signal)

at the beginning of the measurement operation for determining the coefficient of reflection. Although the calculation is carried out during each cycle, this value is unaltered until a change is necessary.

It is indeed possible that the measurement of propagation times obtained by successive impulses diverge from the depths measured by the echo-sounder of the vessel. This is because the strongest signals that are selected by the detector system are not necessarily reflected from the seabed but possibly by an outcropping, slightly inclined reflector whose coefficient of reflection is higher.

The position of the gate during each cycle is worked out from that of the preceding position by the following procedure:

before the start of a new cycle, in the absence of a useful signal, the maximum amplitude of signals received by the receptor C in the addition sampling gate F‴ (FIG. 1) is measure. Alternatively, the average amplitude of n signals successively picked up in the same sampling gate, so as to establish an acquisition threshold, for each signal D and $R_1$ to be received, a sampling gate F, F′ of constant length $\delta$ (FIG. 4) is positioned such that the corresponding gate coincides with the maximal amplitude of the signal received in the preceding cycle, i.e. centered for example on the moment of detection of the highest peak. The signal received is then sampled and from the first measured sample $E_i$ where amplitude is greater than the acquisition threshold, it may be determined whether amongst a number n of consecutive samples, a predetermined value $N_c$ exceeds the threshold value. The value $N_c$ is determined from recordings made later along the same profile, or from measurements made during the initialization phase.

If the required number of samples $N_c$ exceeds the threshold, then the signal detected is not parasitic. Otherwise, the process of comparing amplitudes of n samples is resumed, starting with the sample $E_{i+1}$ that exceeds the threshold. A fixed limit on these reiterations is desirable.

The shifting of the sampling gate for the direct signal D is thus fixed so that it is greater than the size $\delta$ of the gate. For the detection of the reflected signal $R_1$ a wider signal range is permitted, because the propagation time $t_2$ (FIG. 3) fluctuates more than the time $t_1$ owing to variations in seabed slope, or agitation of the sea surface.

The procedure for positioning the windows by counting samples has the particular advantage of facilitating the elimination of isolated noise impulses, which are generally of short duration, and which fluctuate more than the useful signals.

The validity of these latter is accomplished by verifying that the number of samples of amplitudes superior to the threshold value, measured on each impulse before its maximum value, is greater than two or three, for example. If it is not, then the signal received is considered non-significant.

The measuring gate having been well centered on the useful signals D and R, after numerous shifts, one then proceeds to use the different characteristics of the signals measured, either their amplitude or their energies, for the calculation of the coefficient of reflection of the reflector under consideration, using equation (1). The values of the coefficient of reflection can be averaged using the measurements obtained over several successive cycles.

In the plan of the device represented in FIG. 5 it can be seen that the signals received by the detector C in the head of the elongated receptor unit 5 are sent to a variable attenuation element 7. This element is made up of, for example, a stepwise programmable logarithmic attenuator, type AD 7111.

The coefficient of attenuation is dictated by a command circuit 8 that will be described below in relation to FIG. 6. The signals issued by attenuator 7 are amplified by a fixed gain amplifier 9, where the gain is in the order of 40 dB, then fed into an acquisition unit 10 comprising a low-pass filter 11 in series with a high-pass filter 12. The latter consists of one or many switched-capacitor filters.

The filtration characteristics of these elements are governed by a timing signal H′ and a command signal issued by the command circuit 8, specified in relation to FIG. 5. The signals received, having passed through the filtering element 12 are converted by an analog-to-digital converter of known type 13, under a 15 bits floating format, with a dynamic range of 108 dB, then transferred to a buffer memory 14.

An input/output processor IOP (15) containing a "direct memory access" element manages the transfer of data in batches from the buffer memory 14, via a bus 16, towards the memory on a central processing and exchange card 17.

The central processing card 17 is comprised of a central unit 18 connected to the live bus 16, live memory blocks (RAM) 19, programmable memory (EPROM) 20, an element 21 that manages the interruptions of type 8259, a timing and counting element 22, a serial interface 23, a parallel interface 24, and a double access gate 25. All the elements of the central card 17 are interconnected by an internal bus 26.

The gate 25 connects the bus 16 with the RAM blocks 19 or the internal bus 26. The serial interface 23 receives at its input the commands coming from a keyboard 27. The parallel interface 24 has three ports connected by lines 28 to the internal bus of an interface card 30.

Timing signals produced by the clock and counting element 22 are transmitted on the bus 16 and are used to synchronize the functioning of the A/D converter 13 and the high-pass filters 12 as described below.

The interface card 30 is comprised of a primary interface element 31 connected to the CTB sensor (FIG. 1) that detects the triggering moment of the source S, a second interface element 32, which is connected to a printer 33 of known type, a third interface element 34 which is connected to the auxiliary echo-sounder ES on the vessel and a fourth interface element 35 which is connected to a device 36 for controlling the source S.

The interface element 32 transmits to the recorder 33 the analog values from the D/A converter 37 that is connected to the bus 16 or a switch 38 where the inputs are joined to the output of the amplifier 9 and the output of the high-pass filter 12.

The interface element 34 operates to store the different values of water depth provided by the echo-sounder within a cycle and transmits this information to the central processing unit 18 at the beginning of the next cycle upon reception therefrom of a control signal. Central processing unit 18 then provides average values of water depths.

The echo-sounder is situated on the boat generally in front of the detection apparatus. For maximum precision the average depth values measured are memorized and their effective use delayed until the detection device passes over the location where those particular values were obtained.

The element 21 manages the interruptions and receives interruption signals from the processor IOP (15), from the acquisition card 17 through the intermediary of a line ITAC, from the interface element 34 of the echo-sounder, through the intermediary of the bus 29, from the lines 28 and from the line ITES that comes from the control element 24. It also receives interruption signals by way of a line ITCY at the beginning of each measurement cycle and others coming from the keyboard 27 by line ITR.

The command circuit 8 shown in FIG. 6 is adapted so that it can command, on the one hand the attenuator 7 and on the other the high-pass filters 12 on the acquisition card 10 (FIG. 5).

The required attenuation factor depends on the relative size of signals received in the sampling gates centered on the times $t_1$ and $t_2$ (FIG. 4). The relative sizes of signals are a function of water depth which is very variable: from several tens to several hundreds of meters. It also depends on their absolute values that are themselves a particular function of the nature and the power of the source used, whether a sparker or a seismic source is used, the degree of attenuation selected will be smaller or greater.

In order to allow for the acquisition of a dynamic range (108 dB) and of the characteristics of the emission material used, the command circuit is connected to card 17, and can therefore receive optimal control signals.

The command circuit 8 includes an address decoding unit 39 suitable for selection of control signals on the bus 16 relative to attenuation and filtering parameters that come from central card 17 via the multi-bus 16 and transmits these control signals to the internal bus 40, and a memory circuit 41 for memorization of the filtration and attenuation parameters. Data going to the attenuator 7 is transmitted to the memory circuit 41 by the line 42.

The command circuit 8 also comprises a counting unit 43 which is connected to the internal bus 40. It receives on the central card 17 (FIG. 5) a signal from the clock H and a number that corresponds to a dividing coefficient, and produces a timing signal H' at a submultiple frequency to that of the timing signal H.

The timing signal H' filtering parameters such as resonant rise to be given to the high-pass filters 12 are transmitted thereto by the lines 44 and 45.

The attenuation factor applied to the attenuator can attain 80 dB during the reception gate of the direct pulse, and is equal to one (1) for the reflected signal. By combination of attenuator 7 and amplifier 9 level adjustment of received signals is possible regardless of the operating conditions encountered.

Figure 7:
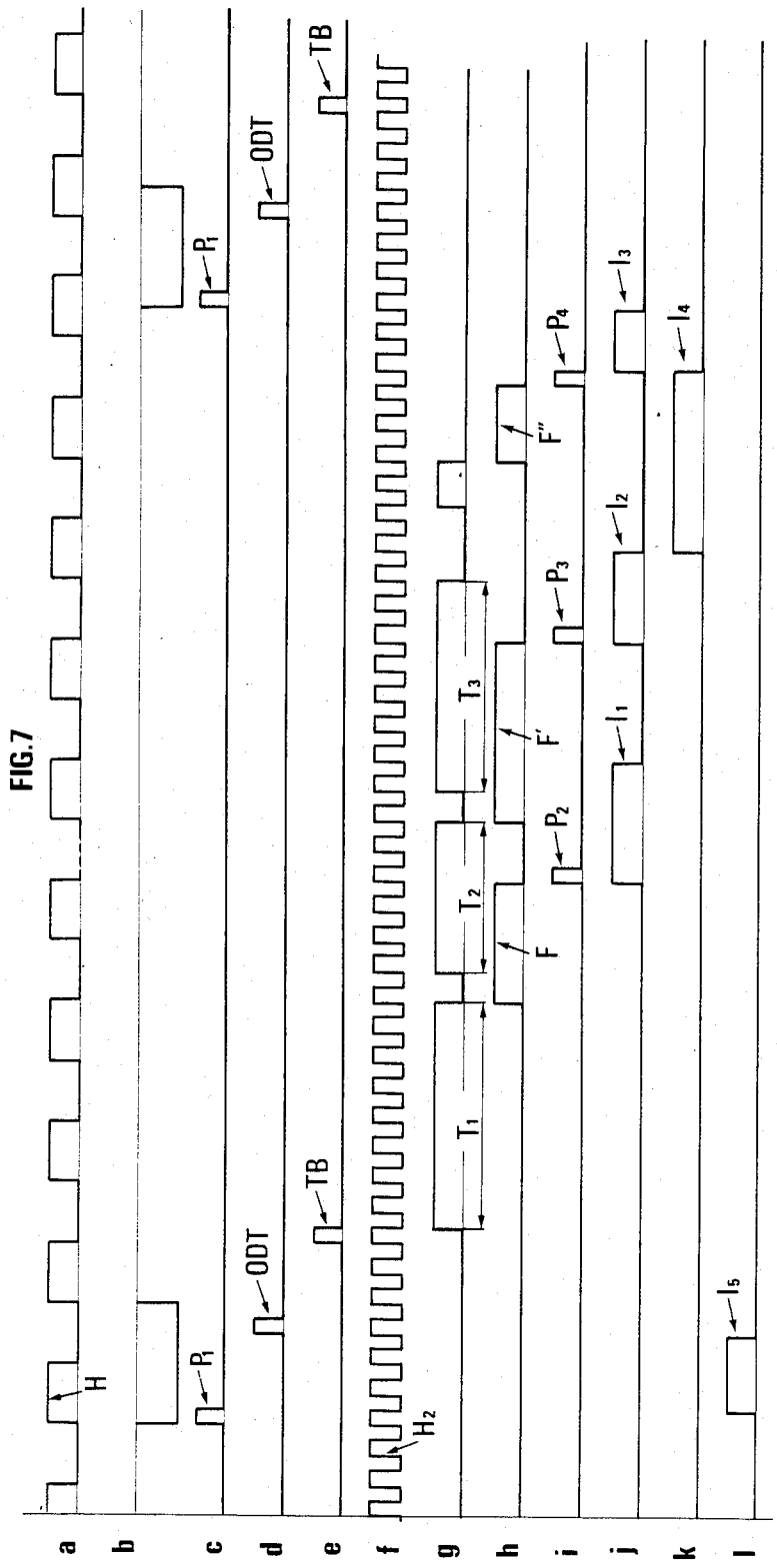
FIG. 7 is a waveform diagram showing the order of the operating stages of the system during each emission-detection cycle.

The organization of each emission-reception cycle is illustrated by the chronological sequences a to l in FIG. 7. These are:

a: a signal produced by a slow clock ($H_1$);

b: a zeroing signal from a clock activated by the slow clock;

c: an impulse $p_1$ for starting or re-initialization of the cycle;

d: an impulse $p_2$ corresponding to a shot order (ODT);

e: an impulse TB that indicates the moment of release of the source S via the sensor CTB (FIG. 1);

f: a signal produced by a fast clock ($H_2$);

g: a signal delivered by a pulse counter incremented by the fast clock ($H_2$). The counter is triggered by the emitted signal TB (graph e) and it executes three well-defined successive timing checks. The successive instants designating the end of these counting gates $T_1$, $T_2$, $T_3$ define the beginnings of the sampling gates F, F' (FIG. 4). The additional timed impulse defines the start of sampling gate F'' for detection of background noise (id. FIG. 4);

h: a signal that represents the sampling gates F, F' and F'';

i: impulses $p_2$, $p_3$, $p_4$ indicating the successive instants when the transfer in blocks of the different signal samples captured during the three sampling gates F, F' and F'', carried out by the processor IOP (15) in the acquisition unit 10, ends (FIG. 5);

j: a signal that defines three time intervals $I_1$, $I_2$, $I_3$ that start at the instants defined in section "i", during which the amplitudes of the acoustic signals and those of the background noise are worked out;

k: a signal that delimits the time interval $I_4$ during which the coefficient of reflection CR of the cycle is calculated, and the value thereof smoothed; and l: a signal that delimits the time interval $I_5$ during which are validated the results from the echo-sounder and in which counting times are calculated by the pulse counter (graph g).

The flow diagrams below, in conjunction with the chronological sequences shown in FIG. 7, define the sequence of functions carried out by the system according to the invention during each cycle.

The following are the symbols and abbreviations used:

CR: designates the coefficient of reflection

Function DMA: is the group of instructions that permit the transfer of the sampled data from the acquisition card 10 to the central card 17;

it: designates the interruption signals;

the dotted lines correspond to the waiting phases while a function is being executed;

NET/MES: designates a sorting stage for waiting messages that have been misinterpreted (due to detection of useless signals). These may be errors due to faulty detection or to excessive background noise, for example; and alarm: designates a reactivation message.

The functioning cycle comprises:

an initialization phase;

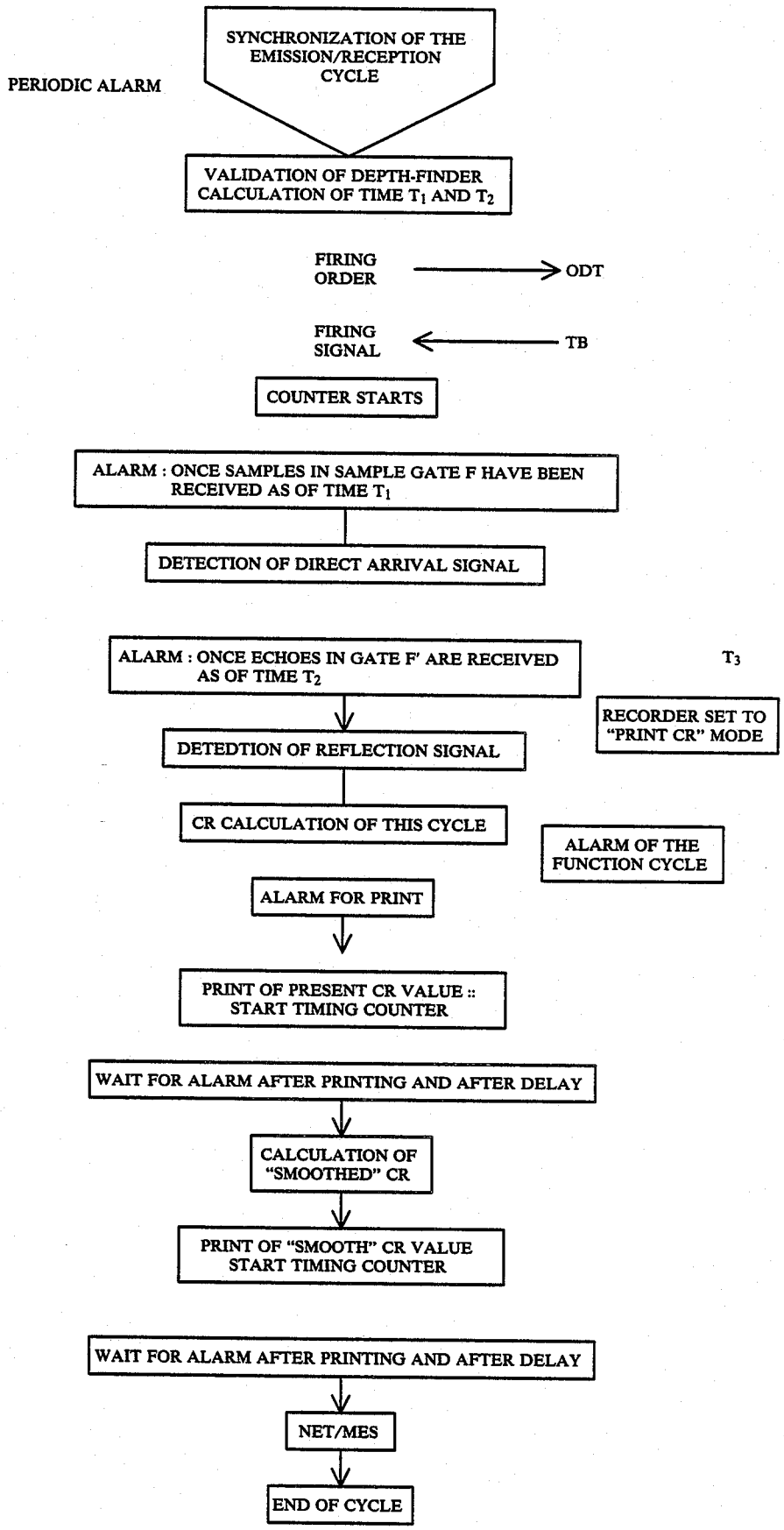

-continued

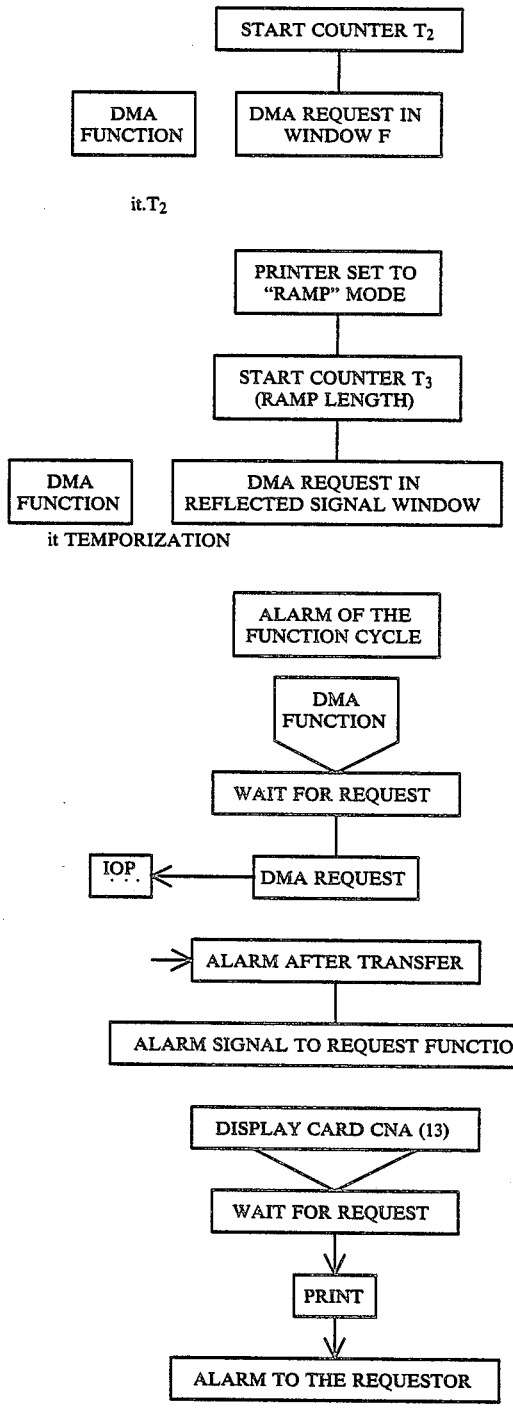

a phase to control the release of the source. The shot order is transmitted from the central card 17 via the interface circuit 35 (FIG. 5). The shot having been fired, task for synchronization of the cycle (or cycle task) is interrupted until the arrival of the signal TB;

a step for acquisition by blocks of samples made by IOP processor 15 upon control of the cycle task. The processor (15) sends a requested number of digitized samples at a rate fixed by the fast clock $H_2$. It stores said samples in memory 14 and transmits them, in blocks, to the central card 17. Once the data has been sent, the processor sends an "it" interruption signal;

A check with the vessel's auxiliary echo-sounder. When the depth changes, the echo-sounder transmits an interruption signal. Periodically the cycle task sends a request for averaging depths measured by the echo-sounder, whereby validation of acquisition gates and determination of the times $T_1$ and $T_2$ at the end of which sampling gates F and F' (FIG. 7) are open can be determined.

A check on the clocks and counters. The slow clock $H_1$ sets the measuring cycles and during the initialization phase, is used for timing of waiting task or awaiting the operator's replies. The fast clock $H_2$ sets the pace for opening and closing the different gates (FIG. 7) and allows for the functioning time of the acquisition card. When the counting reaches the end, a signal whose effect is to activate the different parts of the program according to the value of a variable which depends on the progress of the measuring cycle; and A representation of the results where the recorder 33 traces the amplitude of the reflected signal versus time, as well as smoothed reflection coefficient, taken over a number of measurements.

The analog results fed to the recorder 33 come from the D/A converter 37 (FIG. 5). Synchronization of the A/D converter with the cycle task is achieved by the emission and reception of messages relative to exchange of data stored at specific "letter-box" memory addresses known from tasks intervening in the exchanges.

Each initialized function begins by waiting for an activation. This is particularly so for the cycle task which is periodically activated as soon as the operator has passed the active phase of the measuring cycle.

Irrespective of the functioning mode, the "it" interruption signals originating from the keyboard are given priority. The operator can therefore key directly into the system in order to modify parameters, check peripheries, print results, incorporate reference points in the recordings or display selected parameters such as noise level at the input of acquisition unit 10.

A variety of other functions are possible within the framework of the system according to the invention.

For example, the acquisition unit 10 with a single reception channel (FIG. 5) can be replaced by a multiple reception channel type, each channel can be made to receive a particular frequency range of the signals detected. A representation of the coefficient of reflection as a function of frequency can thus be obtained.

In this case, the high-pass filter 12 will be replaced by several complementary pass-band filters arranged in parallel and also featuring switched capacitance filtering devices whose parameters are imposed by the central card 17 via the intermediary of circuit 8.

The reception assembly (FIG. 1) can be specially made to detect the signals for the measurement of the coefficient of reflection. It can also be a modified seismic streamer, with the receptor C and the depth gauge 7 positioned at the front.

What we claim is:

1. A system for measuring a reflection coefficient of submerged reflectors using sound waves, including a source of acoustic pulses towed underwater by a vessel provided with an echo-sounder for measurement of depth, a detection device having sensor means disposed close to said acoustic source for determining triggering moments of said acoustic source, receiving means also towed by the vessel at a position longitudinally offset with respect to said acoustic source for receiving acoustic pulses, and a control unit operatively connected to said acoustic source, said system comprising: programmable digital computer means for calculating the reflection coefficient of submerged reflectors on the basis of direct comparison of the acoustic pulses received by said receiving means along different paths from said acoustic source; recording means; an interface card including respective interface circuits providing communication between said computer means, said sensor, said recording means and said control unit; variable attenuation means for variably attenuating signals received by said receiving means according to a variable attenuation factor; an acquisition unit under control of said computer means, said acquisition unit including filtering means having adjustable filtering characteristics, and command control means driven by said computer means for controlling said variable attenuation factor of said variable attenuation means and for adjusting the filtering characteristics of said filtering means.

2. A system as claimed in claim 1, comprising bus means for transmission of signals between said computer means and said data acquisition unit and an analog-to-digital converter provided with inputs connected to the said bus means and with outputs connected to the interface circuit associated with said recording means.

3. A system as claimed in claim 1, wherein said variable attenuation means includes a stepwise logarithmic attenuator and said adjustable filtering means includes switched-capacitor filters.

4. A system as claimed in claim 3, comprising control means provided with an address decoding element connected to said bus means, counting means for production of a timing signal for said filtering means, and a memory unit for storing filtering and attenuation factor data, said memory unit being connected to said filtering means and said logarithmic attenuator.

5. A system as claimed in claim 1, wherein said data acquisition unit includes memorizing means for storing digitized signal samples produced by analog-to-digital converter means from signals received from said filtering means and input-output processor means responsive to said computer means for transferring thereto blocks of digitized signal samples stored in said memorizing means.

6. A system as claimed in claim 5, comprising counting means for delimiting three successive reception time intervals and means for positioning the said reception time intervals as a function of the amplitude of signal samples delivered by the analog-to-digital converter, and means for holding said signal samples during said reception time intervals.

7. A system as claimed in claim 5, comprising counting means for delimiting two successive reception time intervals for reception of acoustic signals and a third consequent reception time interval for receiving background noise, means for comparing the amplitudes of the signal samples delivered by said analog-to-digital converter and held during the first two time intervals in such a way as to determine an amplitude-threshold, and means for positioning said tow time intervals so that the number of signal samples of the acoustic signals held during said two intervals with amplitudes greater than the amplitude-threshold is greater than a predetermined number.

* * * * *